United States Patent
Sakamoto

(10) Patent No.: US 12,463,254 B2
(45) Date of Patent: Nov. 4, 2025

(54) SOLID STATE BATTERY

(71) Applicant: TOYOTA JIDOSHA KABUSHIKI KAISHA, Toyota (JP)

(72) Inventor: Ryuto Sakamoto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 681 days.

(21) Appl. No.: 17/686,959

(22) Filed: Mar. 4, 2022

(65) Prior Publication Data

US 2022/0294019 A1 Sep. 15, 2022

(30) Foreign Application Priority Data

Mar. 15, 2021 (JP) .................. 2021-041075

(51) Int. Cl.
*H01M 10/0585* (2010.01)
*H01M 4/02* (2006.01)
*H01M 4/38* (2006.01)
*H01M 4/58* (2010.01)

(52) U.S. Cl.
CPC ....... *H01M 10/0585* (2013.01); *H01M 4/386* (2013.01); *H01M 4/5825* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2019/0288289 A1* | 9/2019 | Fukuda | H01M 4/62 |
| 2019/0363399 A1* | 11/2019 | Yoshioka | H01M 10/0525 |
| 2020/0235435 A1* | 7/2020 | Köstner | H01M 10/0436 |
| 2020/0259128 A1 | 8/2020 | Tanaka et al. | |
| 2021/0218048 A1* | 7/2021 | Dai | H01M 4/134 |

FOREIGN PATENT DOCUMENTS

| | | |
|---|---|---|
| JP | 2004-253155 A | 9/2004 |
| JP | 2017-045578 A | 3/2017 |
| JP | 2020136261 A | 8/2020 |

* cited by examiner

*Primary Examiner* — Nicholas A Smith
(74) *Attorney, Agent, or Firm* — Dinsmore & Shohl LLP

(57) ABSTRACT

An all solid state battery includes an electrode body A and an electrode body B connected in parallel and stacked along a thickness direction. The electrode body A includes a Si based active material, and the electrode body B includes an anode active material B having lower expansion/contraction than the Si based active material. A proportion of a capacity of the electrode body A with respect to a capacity of a total of the electrode body A and the electrode body B is 25% or more and 60% or less.

6 Claims, 2 Drawing Sheets

SOLID STATE BATTERY

CROSS REFERENCE TO RELATED APPLICATION

This application claims priority to Japanese Patent Application No. 2021-041075 filed on Mar. 15, 2021, the entire contents of which are incorporated by reference herein.

TECHNICAL FIELD

The present disclosure relates to an all solid state battery.

BACKGROUND

In recent years, the development of a battery has been actively carried out. For example, the development of a battery and an active material used for a battery, used for a battery electric vehicle or a hybrid electric vehicle has been advanced in the automobile industry.

For example, Patent Literature 1 discloses a lithium ion secondary battery using Si as an anode active material. Also, Patent Literature 2 discloses an all solid state battery stacked body comprising a plurality of monopolar type battery units connected in series to each other. Also, Patent Literature 3 discloses a bipolar battery comprising a plurality of bipolar electrodes stacked in series, sandwiching an electrolyte therebetween.

CITATION LIST

Patent Literatures

Patent Literature 1: Japanese Patent Application Laid-Open (JP-A) No. 2017-045578
Patent Literature 2: JP-A No. 2020-136261
Patent Literature 3: JP-A No. 2004-253155

SUMMARY OF DISCLOSURE

Technical Problem

A high energy density is required for a battery. The theoretical capacity of a Si based active material is large, which is effective in high energy condensation of a battery. On the other hand, the volume variation of the Si based active material is large during charge/discharge. The present disclosure has been made in view of the above circumstances, and a main object of the present disclosure is to provide an all solid state battery having a good energy density, and the volume variation thereof during charge/discharge is suppressed.

Solution to Problem

The present disclosure achieves the object by providing an all solid state battery comprising an electrode body A and an electrode body B connected in parallel and stacked along a thickness direction; the electrode body A includes a first current collector A, a first active material layer A1, a solid electrolyte layer A1, a second active material layer A1, and a second current collector A1, formed in this order from one surface side of the first current collector A, and a first active material layer A2, a solid electrolyte layer A2, a second active material layer A2, and a second current collector A2, formed in this order from another surface side of the first current collector A; the electrode body B is an electrode body wherein two unit cells are connected in series and stacked along the thickness direction; the unit cell is a cell including a first current collector B, a first active material layer B, a solid electrolyte layer B, a second active material layer B, and a second current collector B, in this order; as an anode active material, the electrode body A includes a Si based active material; as an anode active material, the electrode body B includes an anode active material B having lower expansion/contraction than the Si based active material; and a proportion of a capacity of the electrode body A with respect to a capacity of a total of the electrode body A and the electrode body B is 25% or more and 60% or less.

According to the present disclosure, since the electrode body A and the electrode body B include predetermined anode active materials, and the proportion of a capacity of the electrode body A with respect to a capacity of a total of the electrode body A and the electrode body B is in a predetermined range, the all solid state battery has a good energy density, and the volume variation thereof during charge/discharge is suppressed.

In the disclosure, the difference between an operating voltage of the electrode body A and an operating voltage of the electrode body B may be 1 V or less.

The present disclosure also provides an all solid state battery comprising an electrode body A and an electrode body B connected in parallel and stacked along a thickness direction; and the electrode body A includes a first current collector A, a first active material layer A1, a solid electrolyte layer A1, a second active material layer A1, and a second current collector A1, formed in this order from one surface side of the first current collector A, and a first active material layer A2, a solid electrolyte layer A2, a second active material layer A2, and a second current collector A2, formed in this order from another surface side of the first current collector A; the electrode body B is an electrode body wherein a plurality of unit cells are connected in series and stacked along the thickness direction; the unit cell is a cell including a first current collector B, a first active material layer B, a solid electrolyte layer B, a second active material layer B, and a second current collector B, in this order; as an anode active material, the electrode body A includes a Si based active material; as an anode active material, the electrode body B includes an anode active material B having lower expansion/contraction than the Si based active material; a difference between an operating voltage of the electrode body A and an operating voltage of the electrode body B is 1 V or less; and a proportion of a capacity of the electrode body A with respect to a capacity of a total of the electrode body A and the electrode body B is 25% or more and 60% or less.

According to the present disclosure, since the electrode body A and the electrode body B include predetermined anode active materials, and the proportion of a capacity of the electrode body A with respect to a capacity of a total of the electrode body A and the electrode body B is in a predetermined range, the all solid state battery has a good energy density, and the volume variation thereof during charge/discharge is suppressed.

In the disclosure, the anode active material B may be at least one of lithium titanate and hydrogen titanium oxide.

In the disclosure, the electrode body A may include a rock salt bed type active material including Ni and Co, as a cathode active material, and the electrode body B may include an olivine type active material including Fe, as a cathode active material.

Advantageous Effects of Disclosure

The present disclosure exhibits effects of being able to provide an all solid state battery having a good energy density, and the volume variation thereof during charge/discharge is suppressed.

DETAILED DESCRIPTION

Figure 1:
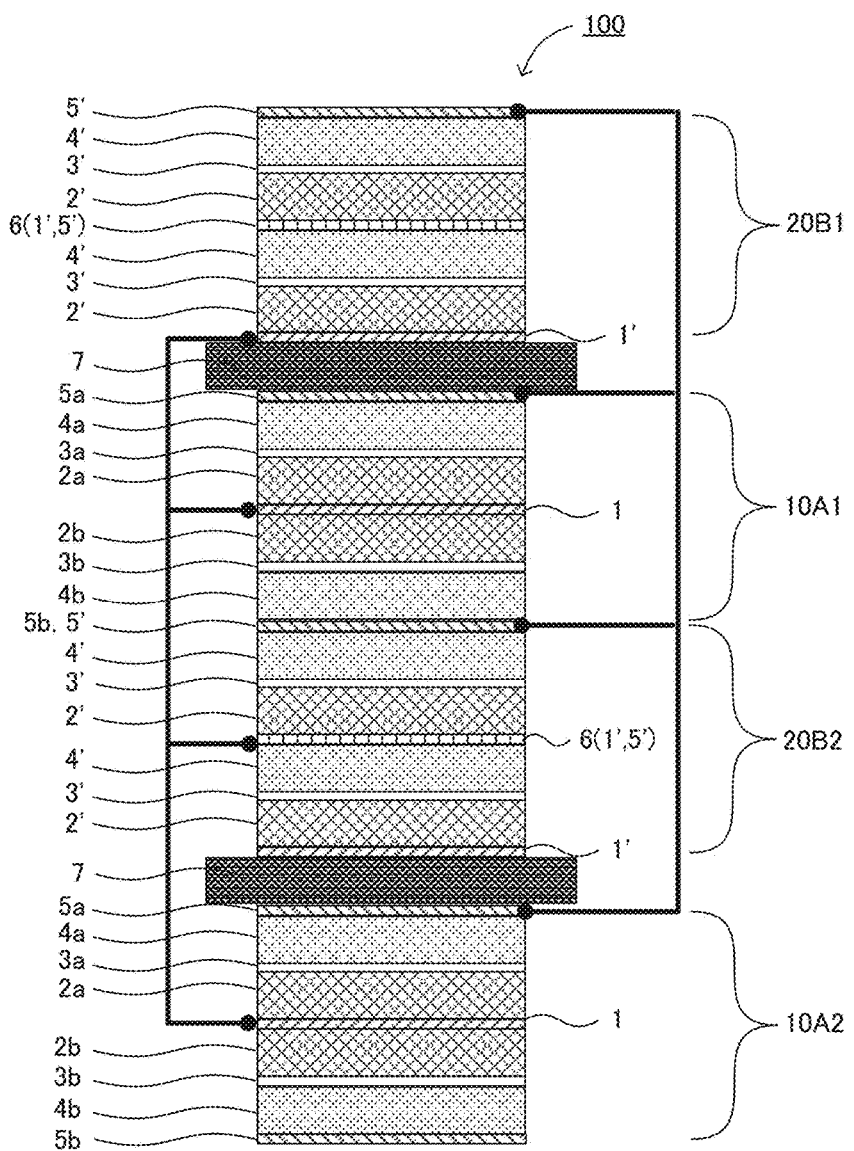
FIG. 1 is a schematic cross-sectional view illustrating an example of an all solid state battery in the present disclosure.

The all solid state battery in the present disclosure will be hereinafter described in detail referring to the drawings. In the present specification, in expressing an embodiment of arranging a member on "surface side" of another member, it may include all the cases of arranging a member directly on the surface of another member; arranging a member on the surface of another member via still another member; and arranging a member on the surface of another member with a predetermined space provided therebetween, to the extent not contradict technically. Also, in each figure shown below, the size and the shape of each member are appropriately exaggerated, to facilitate understanding. Also, in each figure, the hatching or reference sign is appropriately omitted.

Also, in the present disclosure, members named as "first", and members named as "second" respectively has the same polarity. For example, all of first active material layer A1, first active material layer A2, and first active material layer B are cathode active material layers, or all of them are anode active material layers.

FIG. 1 is a schematic cross-sectional view illustrating an example of an all solid state battery in the present disclosure. All solid state battery 100 shown in FIG. 1 comprises electrode body A and electrode body B connected in parallel and stacked along a thickness direction. Specifically, electrode body 20B1, electrode body 10A1, electrode body 20B2, and electrode body 10A2 are alternately stacked along the thickness direction. Electrode body A and electrode body B are connected in parallel as described below. That is, in adjacent electrode body A and electrode body B, when the polarities of the facing current collectors are different, the facing current collectors are insulated via, for example, an insulating layer. Meanwhile, when the polarities of the facing current collectors are the same, the facing current collectors are electrically connected to each other not via, for example, an insulating layer.

Specifically, in FIG. 1, insulating layer 7 is placed between first current collector B (1') of electrode body B (20B1) and second current collector A1 (5a) of electrode body A (10A1); and between first current collector B (1') of electrode body B (20B2) and second current collector A1 (5a) of electrode body A (10A2), so that facing current collectors are insulated. Meanwhile, between first current collectors (1, 1'), and between second current collectors (5a, 5b, 5') in electrode body A and electrode body B are electrically connected. Incidentally, electrode body A (10A1) and electrode body B (20B2) share second current collector A2 (5b) and second current collector B (5'). Also, as an anode active material, electrode body A includes a Si based active material; and as an anode active material, electrode body B includes anode active material B having lower expansion than the Si based active material. Also, the proportion of a capacity of electrode body A with respect to a capacity of the total of electrode body A and electrode body B is in a predetermined range.

According to the present disclosure, as described above, since electrode body A and electrode body B include predetermined anode active materials, and the capacity of the electrode body A with respect to the capacity of the total of electrode body A and electrode body B is in a predetermined range, the all solid state battery has a good energy density, and the volume variation thereof during charge/discharge is suppressed. An electrode body including a Si based active material as an anode active material may contribute to an improvement in energy density of an all solid state battery. Also, an electrode body including an active material having lower expansion as an anode active material may contribute to a suppression of the expansion of an all solid state battery. In the present disclosure, the balance of the energy density and the expansion (energy density/expansion) of an all solid state battery may be improved by including such electrode bodies at a predetermined proportion.

1. Structure of all Solid State Battery

In the all solid state battery in the present disclosure, electrode body A and electrode body B are connected in parallel, and are stacked along the thickness direction. Electrode body A and electrode body B will be described later.

In the present disclosure, the proportion of a capacity of electrode body A with respect to a capacity of the total of electrode body A and electrode body B is in a predetermined range. The proportion of the capacity of electrode body A is usually 25% or more, may be 30% or more, and may be 40% or more. Meanwhile, the proportion of the capacity of electrode body A is usually 60% or less, and may be 50% or less. When the proportion of the capacity of electrode body A is too low, a sufficient energy density may not be obtained. Meanwhile, when the proportion of the capacity of electrode body A is too high, the volume variation of the all solid state battery may not be sufficiently suppressed. Also, when the all solid state battery includes a plurality of electrode bodies A, "capacity of electrode body A" denotes the total of capacity of the plurality of electrode bodies A. Similarly, when the all solid state battery includes a plurality of electrode bodies B, "capacity of electrode body B" denotes the total of capacity of the plurality of electrode bodies B. Also, "capacity" in the present disclosure is defined as follows. That is, it is determined from the capacity per one electrode body charged/discharged in an operating voltage range of the battery (such as 2.5 V to 4.05 V).

The operating voltage of electrode body A and the operating voltage of electrode body B are close, in embodiments. The difference in the operating voltage is, for example, 1 V or less, may be 0.5 V or less, and may be 0.1 V or less. The operating voltage may be determined from the difference between an average reaction potential of a cathode active material and an average reaction potential of an anode active material. Also, the operating voltage may be adjusted by changing the types of the cathode active material and the anode active material of the electrode body.

The number of electrode body A and electrode body B may be one, and may be two or more, respectively. Also, the number of electrode body A and electrode body B may be the same, and may be different. The total number of electrode body A and electrode body B may be, for example, 2 or more, may be 3 or more, may be 10 or more, and may be 50 or more. Meanwhile, the total number of electrode body A and electrode body B may be, for example, 200 or less, may be 150 or less, and may be 100 or less.

As illustrated in FIG. 1, a plurality of electrode bodies A and electrode bodies B may be stacked alternately. Also, a plurality of electrode bodies A may be stacked continuously along the thickness direction, and may form electrode body group α. Similarly, a plurality of electrode bodies B may be stacked continuously along the thickness direction, and may form electrode body group β. In electrode body groups α, β, a plurality of electrode bodies are connected in parallel, in embodiments. Also, in embodiments, the all solid state battery includes at least one region of region I wherein a plurality of electrode bodies A and electrode bodies B are stacked alternately; region II wherein a plurality of electrode bodies A are stacked continuously; and region III wherein a plurality of electrode bodies B are stacked continuously. The all solid state battery may include two or more of the regions, and may include all of the regions.

The present disclosure may also provide the following all solid state battery. That is, the present disclosure may also provide an all solid state battery comprising an electrode body A and an electrode body B connected in parallel and stacked along a thickness direction; and the electrode body A includes a first current collector A, a first active material layer A1, a solid electrolyte layer A1, a second active material layer A1, and a second current collector A1, formed in this order from one surface side of the first current collector A, and a first active material layer A2, a solid electrolyte layer A2, a second active material layer A2, and a second current collector A2, formed in this order from another surface side of the first current collector A; the electrode body B is an electrode body wherein a plurality of unit cells are connected in series and stacked along the thickness direction; the unit cell is a cell including a first current collector B, a first active material layer B, a solid electrolyte layer B, a second active material layer B, and a second current collector B, in this order; as an anode active material, the electrode body A includes a Si based active material; as an anode active material, the electrode body B includes an anode active material B having lower expansion/contraction than the Si based active material; a difference between an operating voltage of the electrode body A and an operating voltage of the electrode body B is 1 V or less; and a proportion of a capacity of the electrode body A with respect to a capacity of a total of the electrode body A and the electrode body B is 25% or more and 60% or less.

2. Electrode Body A

Figure 2:
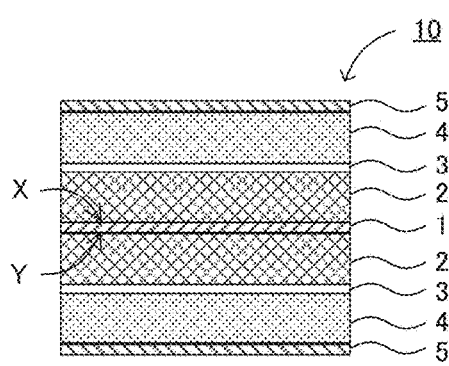
FIG. 2 is a schematic cross-sectional view illustrating an example of an electrode body A in the present disclosure.

Electrode body A in the present disclosure is a monopolar type electrode body. FIG. 2 is a schematic cross-sectional view illustrating an example of an electrode body A. Electrode body A (10) illustrated in FIG. 2 includes first current collector A (1), first active material layer A1 (2a), solid electrolyte layer A1 (3a), second active material layer A1 (4a), and second current collector A1 (5a), formed in this order from one surface side (X) of first current collector A (1), and first active material layer A2 (2b), solid electrolyte layer A2 (3b), second active material layer A2 (4b), and second current collector A2 (5b), formed in this order from another surface side (Y) of first current collector A (1).

In electrode body A, first current collector A is a cathode current collector or an anode current collector. When first current collector A is a cathode current collector, both of first active material layer A1 and first active material layer A2 are cathode active material layers, both of second active material layer A1 and second active material layer A2 are anode active material layers, and both of second current collector A1 and second current collector A2 are anode current collectors.

The anode active material layer in electrode body A includes at least a Si based active material as an anode active material. The Si based active material is an active material including a Si element. Examples of the Si based active material may include a Si simple substance, and a Si alloy. In embodiments, the Si alloy includes a Si element as a main component. Examples of the shape of the Si based active material may include a granular shape. The average particle size ($D_{50}$) of the Si based active material is, for example, 10 nm or more, and may be 100 nm or more. Meanwhile, average particle size ($D_{50}$) of the Si based active material is, for example, 50 μm or less, and may be 20 μm or less. The average particle size ($D_{50}$) may be calculated from a measurement with, for example, a laser diffraction particle size analyzer, and a scanning type electron microscope (SEM).

The anode active material layer in electrode body A may include only the Si based active material as the anode active material, in embodiments, and may include other anode active material, in embodiments. In the latter case, the proportion of the Si based active material with respect to the total anode active material is, for example, 90 weight % or more, may be 95 weight % or more, and may be 99 weight % or more.

Also, the anode active material layer in electrode body A may include at least one of a binder, and a solid electrolyte, as required.

The binder is not limited as long as it is chemically and electrically stable. Examples of the binder may include fluorine based binders such as polyvinylidene fluoride (PVDF), and polytetrafluoroethylene (PTFE); and rubber based binders such as acrylate butadiene rubber (ABR), and styrene-butadiene rubber (SBR).

The solid electrolyte is an inorganic solid electrolyte, in embodiments. Examples of the inorganic solid electrolyte may include sulfide solid electrolyte, oxide solid electrolyte, nitride solid electrolyte, and halide solid electrolyte. In embodiments, the inorganic solid electrolyte is sulfide solid electrolyte.

The cathode active material layer in electrode body A includes at least a cathode active material, and may include at least one of a binder, and a solid electrolyte, as necessary. The binder and the solid electrolyte are similar to those in the anode active material layer described above.

Examples of the cathode active material may include oxide active materials such as rock salt bed type active material, spinel type active material, and olivine type active materials. Electrode body A, in embodiments, include a rock salt bed type active material as a cathode active material.

The rock salt bed type active material includes, for example, Li, $M^1$ ($M^1$ is at least one of Co, Mn, Ni, V, and Al), and O. $M^1$ may be two or more of the above metal, and may be three or more of the above metal. The rock salt bed type active material, in embodiments, includes Ni and Co, as $M^1$. Specific examples of the rock salt bed type active material including Ni and Co may include an active material including Li, Ni, Co, Mn, and O (such as $LiNi_{1/3}Co_{1/3}Mn_{1/3}O_2$), and an active material including Li, Ni, Co, Al, and O (such as $LiNi_{0.80}Co_{0.15}Al_{0.05}O_2$). Other examples of the rock salt bed type active material may include $LiCoO_2$, $LiMnO_2$, $LiNiO_2$, and $LiVO_2$.

The spinel type active material includes, for example, Li, $M^2$ ($M^2$ is at least one of Mn, and Ni), and O. Specific examples of the spinel type active material may include $LiMn_2O_4$, and $Li(Ni_{0.5}Mn_{1.5})O_4$. Also, the spinel type active material may include Li, Ti, and O (such as $Li_4Ti_5O_{12}$).

The olivine type active material includes, for example, Li, $M^3$ ($M^3$ is at least one of Fe, Mn, Ni, Co), and $PO_4$ structure. $M^3$ may include at least Fe. Specific examples of the olivine type active material may include $LiFePO_4$, $LiMnPO_4$, $LiNiPO_4$, and $LiCoPO_4$.

The surface of the cathode active material may be coated with an ion conductive oxide. Examples of the ion conductive oxide may include $LiNbO_3$. Incidentally, for the cathode active material, an active material having operating voltage close to that of electrode body B described below, is selected in embodiments.

The solid electrolyte layer in electrode body A includes at least a solid electrolyte, and may include a binder, as necessary. The solid electrolyte and the binder are similar to those described for the anode active material layer described above.

The material used for the current collector in electrode body A is not particularly limited; and conventionally known materials may be used for the cathode current collector or the anode current collector of the all solid state battery. Examples thereof may include SUS, Al, Cu, Ni, Fe, Ti and C. For the cathode current collector, Al, Ni and C are desirable, and for the anode current collector, Cu and Ni are desirable.

3. Electrode Body B

Figure 3:
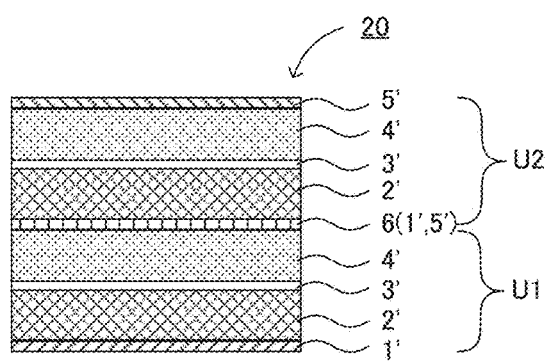
FIG. 3 is a schematic cross-sectional view illustrating an example of an electrode body B in the present disclosure.

Electrode body B in the present disclosure is an electrode body wherein two unit cells are connected in series and stacked along the thickness direction. FIG. 3 is a schematic cross-sectional view illustrating an example of an electrode body B. In electrode body B (20) illustrated in FIG. 3, unit cells U1 and U2 including first current collector B (1'), first active material layer B (2'), solid electrolyte layer B (3'), second active material layer B (4'), and second current collector B (5'), in this order, are connected in series. Electrode body B in FIG. 3 is a bipolar type electrode body wherein unit cell U1 and unit cell U2 are connected, sharing intermediate current collector 6. That is, intermediate current collector 6 functions as both second current collector B (5') in unit cell U1 and first current collector B (1') in unit cell U2.

As described above, when the current collector of unit cell U1 located at closest to unit cell U2 side, and the current collector of unit cell U2 located at closest to unit cell U1 side have different polarity, electrode body B corresponds to a bipolar electrode body. Meanwhile, when the current collector of unit cell U1 located at closest to unit cell U2 side, and the current collector of unit cell U2 located at closest to unit cell U1 side have the same polarity, unit cell U1 and unit cell U2 may be connected in series by stacking via an insulating layer.

The anode active material layer in electrode body B includes at least an anode active material B having lower expansion/contraction than the Si based active material described above.

The expansion/contraction of anode active material B with respect to the expansion/contraction of the Si based active material is, for example 0.9 or less, may be 0.5 or less, may be 0.1 or less, and may be 0.05 or less. The proportion may be determined by comparing the maximum expansion rates (%) of the anode active materials during charge/discharge. The maximum expansion rate may be calculated by observing the cross-sectional SEM image of a battery before charging and in fully charged condition. The number of the sample may be large; for example, 20 or more, may be 50 or more, and may be 100 or more.

Examples of the anode active material B may include lithium titanate such as $Li_4Ti_5O_{12}$, and hydrogen titanium oxide such as $H_2Ti_{12}O_{25}$.

The anode active material layer in electrode body B may include only the anode active material B as the anode active material, in embodiments, and may include other anode active material, in embodiments. In the latter case, the proportion of anode active material B with respect to the total anode active material is, for example, 90 weight % or more, may be 95 weight % or more, and may be 99 weight % or more.

The anode active material layer in electrode body B may include at least one of a binder, and a solid electrolyte, as necessary. The binder and the solid electrolyte are similar to those described in "2. Electrode body A" above.

The cathode active material layer in electrode body B includes at least a cathode active material, and may include at least one of a binder, and a solid electrolyte, as necessary. The binder and the solid electrolyte are similar to those described for the anode active material layer described above.

Examples of the cathode active material may include similar active materials as the cathode active material described in "2. Electrode body A" above, and, in embodiments, the cathode active material is selected so that the operating voltages of electrode body A and electrode body B are close. Electrode body B, in embodiments, may include an olivine type active material including Fe, as the cathode active material.

The material of the solid electrolyte layer and the current collector in electrode body B are similar to those described in "2. Electrode body A" above.

4. All Solid State Battery

The all solid state battery in the present disclosure usually include an exterior body that houses a stacked body of stacked electrode body A and electrode body B; and a current collector tab. Also, an insulating layer formed between electrode body A and electrode body B is provided, as necessary. The exterior body is not particularly limited; and examples thereof may include an Al laminate. The current collector tab is stacked on the current collector at the end of the stacked body, and may have a structure extending from the inside of the exterior body to the outside of the exterior body. The material of the exterior body is not particularly limited, conventionally known materials may be used. Also, in embodiments, the insulating layer may include a resin such as polyimide, and polyethylene terephthalate (PET). The area of the insulating layer is, in embodiments, larger than the area of electrode body A and electrode body B, viewed from the thickness direction.

The type of the all solid state battery in the present disclosure is not particularly limited; and typically a lithium ion battery. Also, the all solid state battery in the present disclosure may be a primary battery and may be a secondary battery. In embodiments, the all solid state battery may be the secondary battery so as to be repeatedly charged and discharged, and be useful as a car-mounted battery, for example.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

<Production of Electrode Body A>
(Production of Cathode)

Using a tumbling fluidized bed granulating-coating machine (from Powrex Corp.), NCM based cathode active material particles (particles including $Li_{1.15}Ni_{1/3}Co_{1/3}Mn_{1/3}O_2$ as a main phase) were coated with lithium niobate under an air atmosphere, and was burned under an air atmosphere. Thereby, cathode active material particles including lithium niobate covering layer were obtained.

As materials of a cathode mixture, a PVDF, the cathode active material particles described above, a glass ceramic type solid electrolyte, and a VGCF (from Showa Denko Co., Ltd.) were used. These were added to a polypropylene container, and the container was stirred for 30 seconds with an ultrasonic dispersion apparatus (UH-50, from SMT Corp.). Next, the container was shaken with a shaker (TTM-1, from Sibata Scientific Technology LTD.) for 3 minutes, further, stirred for 30 seconds with the ultrasonic dispersion apparatus. After shaking with the shaker for 3 minutes, an aluminum foil was coated with the resultant to be 72 mm width, by a blade method using an applicator. Incidentally, in the above, the composition of the cathode mixture was adjusted so that the electron conductivity of the cathode was 20 mS/cm, and the ion conductivity of the cathode was 0.1 mS/cm. After naturally drying, the coating layer was dried for 30 minutes on a hot plate adjusted to be 100° C., thereby obtaining a cathode including a cathode layer on an aluminum foil.

(Production of Anode)

As materials of an anode mixture, a NMP, a polyamic acid, anode active material particles (Si particles), and a VGCF were used. These were added to a polypropylene container, and the container was stirred for 30 minutes with an ultrasonic dispersion apparatus. The both sides of a Ni foil were coated with the resultant by a blade method using an applicator. After naturally drying, the coating layer was dried for 30 minutes on a hot plate adjusted to be 150° C. Then, an argyrodite type solid electrolyte dissolved in an ethanol was vacuum impregnated. Thereby, obtaining an anode including anode mixture layers on both sides of the Ni foil.

(Production of Solid Electrolyte Layer)

As materials of a solid electrolyte layer, a heptane, a polybutadiene rubber (BR), and a sulfide solid electrolyte were used. These were added to a polypropylene container, and the container was stirred for 30 seconds with an ultrasonic dispersion apparatus. Next, the container was shaken with a shaker for 30 minutes, further, stirred for 30 seconds with the ultrasonic dispersion apparatus. After shaking with the shaker for 3 minutes, an aluminum foil (substrate) was coated with the resultant by a blade method using an applicator. After naturally drying, the coating layer was dried for 30 minutes on a hot plate adjusted to be 100° C. Thereby a transfer member including a solid electrolyte layer formed on the aluminum foil (substrate) was produced.

(Production of Electrode Body A)

The anode and the transfer member were pasted together so that the anode mixture layer and the solid electrolyte layer were in direct contact, and pressed under 1.6 t/cm. Then, the aluminum foil as a substrate was peeled off. Thereby, a stacked body including the anode mixture layer and the solid electrolyte layer on the Ni foil, was obtained. Subsequently, the cathode and the stacked body were pasted together so that the cathode mixture layer of the cathode and the solid electrolyte layer of the stacked body were in direct contact, and pressed under 1.6 t/cm. Then, the aluminum foil was peeled off, and pressed under 5 t/cm at 165° C. to densify thereof. Then, an electrode body was obtained by burning at 350° C. On both sides of this electrode body, a carbon coating foil was pasted onto the cathode mixture layer, using BR. Thereby, electrode body A was produced.

<Production of Electrode Body B>
(Production of Cathode)

Particles including olivine type iron as a main phase ($LiFePO_4$) were used as cathode active material particles. Except for this, cathode active material particles including lithium niobate covering layer were obtained in the same manner as for electrode body A.

As materials of a cathode mixture layer, the cathode active material particles described above was used. Except for this, a cathode including the cathode mixture layer on an aluminum foil (cathode current collector) was obtained in the same manner as for electrode body A. Incidentally, the composition of the cathode mixture was adjusted so that the electron conductivity of the cathode was 20 mS/cm, and the ion conductivity of the cathode was 0.1 mS/cm.

(Production of Anode)

Lithium titanate (LTO: $Li_4Ti_5O_{12}$) particles were used as anode active material particles. Except for this, an anode including the anode mixture layer on a Ni foil was obtained in the same manner as for electrode body A.

(Production of Solid Electrolyte Layer)

A transfer member including a solid electrolyte layer formed on an aluminum foil (substrate) was produced in the same manner as for electrode body A.

(Production of Electrode Body B)

The anode and the cathode were pasted together so that the Ni foil and the cathode mixture layer were in direct contact, and pressed under 1.6 t/cm. Then, the aluminum foil was peeled off. Thereby, a power generation element including the anode mixture layer formed on one side of the Ni foil, and the cathode mixture layer formed on the other side, was obtained. The two transfer members were pasted onto the power generation element so that the solid electrolyte layer were respectively in direct contact with the cathode mixture layer and the anode mixture layer, and pressed under 1.6 t/cm. Then, the aluminum foils of the transfer members were peeled off to obtain a stacked body. The stacked body and the anode were pasted so that the cathode mixture layer side solid electrolyte layer of this stacked body and the anode mixture layer of the anode were in direct contact; and the stacked body and the cathode were pasted so that the anode mixture layer side solid electrolyte layer and the cathode mixture layer of the cathode were in direct contact, and pressed under 1.6 t/cm. Then, the aluminum foil of the cathode was peeled off, and pressed under 5 t/cm at 165° C. to densify thereof to obtain an electrode body. On both sides of this electrode body, a carbon coating foil was pasted onto the cathode mixture layer, using BR. Thereby, electrode body B was produced.

<Production of all Solid State Battery>

A PET film was pasted on the anode current collector foil side of electrode body B, and this and electrode A were alternately stacked, and total of 30 layers were stacked. At this time, the Ni foil was used as an anode current collector, the Al foil was used as a cathode current collector, and the cathode current collector tab and the anode current collector tab were extended from the opposite side from each other, of the all solid state battery, so that the tabs were mutually insulated.

Example 2

One electrode body A was treated as one set, and three electrode bodies B were treated as one set. Eight respective sets were stacked (total of 32 electrode bodies). An all solid state battery was produced in the same manner as in Example 1 except for the above.

Example 3

A stacked body including total of five layers, that is, three stacked electrode bodies A sandwiched between two electrode bodies B was treated as one set. Six sets were stacked (total of 30 electrode bodies). An all solid state battery was produced in the same manner as in Example 1 except for the above.

Comparative Example 1

30 electrode bodies A were stacked. An all solid state battery was produced in the same manner as in Example 1 except for the above.

Comparative Example 2

30 electrode bodies B were stacked. An all solid state battery was produced in the same manner as in Example 1 except for the above.

Comparative Example 3

Electrode body B was produced in the manner that the method described in "(Production of electrode body B)" was changed to the method described in "(Production of electrode body A)". An all solid state battery was produced in the same manner as in Example 1 except for the above.

Comparative Example 4

One electrode body A, and 29 electrode bodies B were stacked. An all solid state battery was produced in the same manner as in Example 1 except for the above.

Comparative Example 5

29 electrode bodies A, and one electrode body B were stacked. An all solid state battery was produced in the same manner as in Example 1 except for the above.

[Evaluation]

<Measurement of Energy Density>

Figure 4:
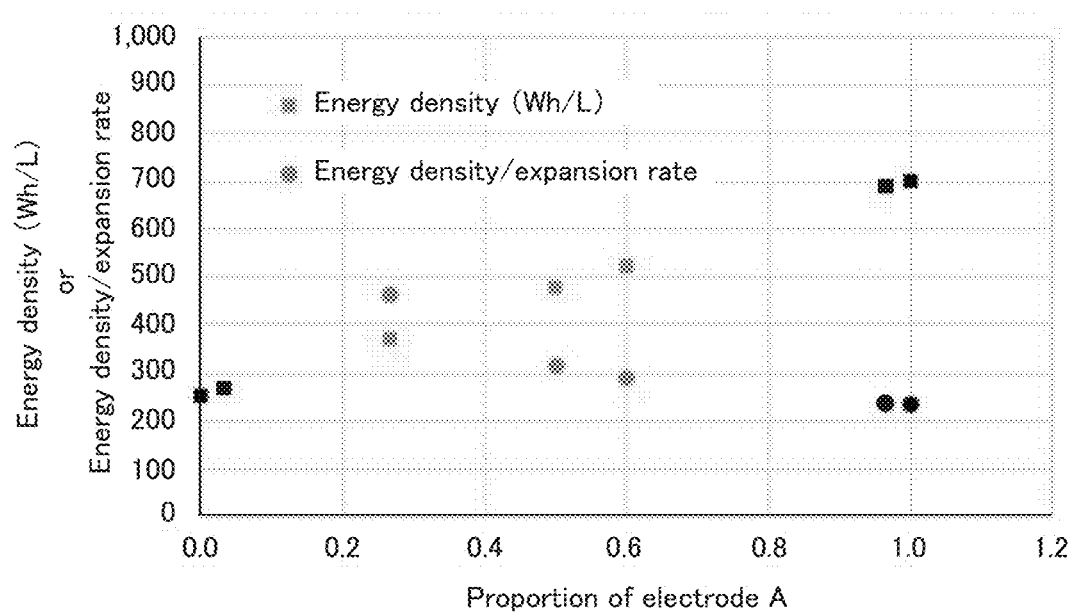
FIG. 4 is a graph showing the results of Examples and Comparative Examples.

To respective produced all solid state batteries, CCCV charge (completion current: 0.01 C) was performed at 0.1 C, until 4.05 V. Then, CCCV discharge (completion current: 0.01 C) was performed at 0.1 C, until 2.5 V. The discharge capacity on completing the discharge, and the energy density (Wh/L), from the average voltage at that time, were calculated. The results are shown in Table 1. Also, the results in Examples 1 to 3, and Comparative Examples 1, 2, 4, and 5 are shown in FIG. 4.

<Measurement of Expansion>

Thickness $V1$ of the battery at of voltage 4.05 V (on completing the charge), and thickness $V2$ of the battery at voltage of 2.5 V (on completing the discharge) were measured, and the expansion was calculated from the following formula.

$$\text{Expansion}(\%) = 100 \times (V1 - V2)/V2$$

Incidentally, the thickness of the battery was measured using a caliper with minimum gap scale between metal plates of 1 μm, in a state confined under 5 MPa. Also, the measurement was carried out for four points so that an intersection point of diagonal lines of the measured points was at the center of the electrode body, and the average thereof was regarded as the thickness of the battery. Vales of expansion, values wherein the energy density was divided by the expansion, are shown in Table 1. Also, the results of energy density/expansion in Examples 1 to 3, and Comparative Examples 1, 2, 4, and 5 are shown in FIG. 4.

<Seal-Out Test>

To respective produced all solid state batteries, CC charge/discharge was carried out for 500 times at 2 C, in a voltage range of 3 V to 4 V. Also, the respective batteries were vacuumed, and whether the batteries expand or not, was checked. When the battery was expanded, it was determined as did not seal-out.

TABLE 1

| | | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|---|
| Electrode body A | Cathode active material | NCM | NCM | NCM | NCM | NCM | NCM | NCM | NCM |
| | Anode active material | Si | Si | Si | Si | Si | Si | Si | Si |
| | Energy density (Wh/L) | 700 | 700 | 700 | 700 | 700 | 700 | 700 | 700 |
| Electrode body B | Cathode active material | | | | LiFePO$_4$ | | | | |
| | Anode active material | LTO | LTO | LTO | LTO | LTO | LTO | LTO | LTO |
| | Energy density (Wh/L) | 252 | 252 | 252 | 252 | 252 | 252 | 252 | 252 |
| Number of electrode body B in series | | 2 | 2 | 2 | 2 | 2 | 1 | 2 | 2 |
| Proportion of electrode body A in capacity | | 0.5 | 0.25 | 0.6 | 1.0 | 0.0 | 0.5 | 0.03 | 0.97 |
| Energy density (Wh/L) | | 476 | 372 | 521 | 700 | 252 | 350 | 267 | 685 |
| Expansion (%) | | 1.50 | 0.80 | 1.80 | 3.00 | 0.00 | 1.50 | 0.10 | 2.90 |
| Energy density/expansion | | 317 | 464 | 289 | 233 | Infinite | 233 | 2,669 | 236 |

As shown in Table 1 and FIG. 4, the balance of the energy density and the expansion (energy density/expansion) of the battery in Examples 1 to 3 was preferable compared to Comparative Examples 1 to 5, and the volume expansion was suppressed while maintaining a preferable energy density. Incidentally, in Comparative Example 3, it is believed that, since the difference between the operating voltage of electrode body A and the operating voltage of electrode body B was large, sufficient discharge capacity was not obtained, the energy density was decreased, and the value of energy density/expansion was decreased. Further, although the energy density was preferable in Comparative Examples 1 and 5, the volume expansion was large, and the seal-out has occurred.

REFERENCE SIGNS LIST

1 . . . first current collector
2 . . . first active material layer
3 . . . solid electrolyte layer
4 . . . second active material layer
5 . . . second current collector
6 . . . intermediate current collector
7 . . . insulating layer
10 . . . electrode body A
20 . . . electrode body B
100 . . . all solid state battery

What is claimed is:

1. An all solid state battery comprising an electrode body A and an electrode body B connected in parallel and stacked along a thickness direction;
the electrode body A includes
a first current collector A,
a first active material layer A1, a solid electrolyte layer A1, a second active material layer A1, and a second current collector A1, formed in this order from one surface side of the first current collector A, and
a first active material layer A2, a solid electrolyte layer A2, a second active material layer A2, and a second current collector A2, formed in this order from another surface side of the first current collector A;
the electrode body B is an electrode body wherein two unit cells are connected in series and stacked along the thickness direction;
each unit cell is a cell including a first current collector B, a first active material layer B, a solid electrolyte layer B, a second active material layer B, and a second current collector B, in this order;
as an anode active material, the electrode body A includes a Si based active material;
as an anode active material, the electrode body B includes an anode active material B having lower expansion/contraction than the Si based active material; and
a proportion of a capacity of the electrode body A with respect to a capacity of a total of the electrode body A and the electrode body B is 25% or more and 60% or less.

2. The all solid state battery according to claim 1, wherein a difference between an operating voltage of the electrode body A and an operating voltage of the electrode body B is 1 V or less.

3. An all solid state battery comprising an electrode body A and an electrode body B connected in parallel and stacked along a thickness direction; and
the electrode body A includes
a first current collector A,
a first active material layer A1, a solid electrolyte layer A1, a second active material layer A1, and a second current collector A1, formed in this order from one surface side of the first current collector A, and
a first active material layer A2, a solid electrolyte layer A2, a second active material layer A2, and a second current collector A2, formed in this order from another surface side of the first current collector A;
the electrode body B is an electrode body wherein a plurality of unit cells are connected in series and stacked along the thickness direction;
each unit cell is a cell including a first current collector B, a first active material layer B, a solid electrolyte layer B, a second active material layer B, and a second current collector B, in this order;
as an anode active material, the electrode body A includes a Si based active material;
as an anode active material, the electrode body B includes an anode active material B having lower expansion/contraction than the Si based active material;
a difference between an operating voltage of the electrode body A and an operating voltage of the electrode body B is 1 V or less; and
a proportion of a capacity of the electrode body A with respect to a capacity of a total of the electrode body A and the electrode body B is 25% or more and 60% or less.

4. The all solid state battery according to claim 1, wherein the anode active material B is at least one of lithium titanate and hydrogen titanium oxide.

5. The all solid state battery according to claim 4, wherein:
the electrode body A includes a rock salt bed type active material including Ni and Co, as a cathode active material, and
the electrode body B includes an olivine type active material including Fe, as a cathode active material.

6. The all solid state battery of claim 1, further comprising an insulating layer connected in parallel and stacked along a thickness direction with the electrode body A and the electrode body B, wherein the insulating layer is placed between the first current collector B of the electrode body B and the second current collector A1 of the electrode body A.

* * * * *